(12) United States Patent
Berkcan et al.

(10) Patent No.: US 8,718,979 B2
(45) Date of Patent: May 6, 2014

(54) HIGH ACCURACY WIRELESS SENSING PLATFORM

(75) Inventors: Ertugrul Berkcan, Clifton Park, NY (US); Emad Andarawis Andarawis, Ballston Lake, NY (US); Vinayak Tilak, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 580 days.

(21) Appl. No.: 13/077,598

(22) Filed: Mar. 31, 2011

(65) Prior Publication Data

US 2012/0253747 A1    Oct. 4, 2012

(51) Int. Cl.
*G06F 19/00* (2011.01)

(52) U.S. Cl.
USPC .......................................................... 702/188

(58) Field of Classification Search
USPC ........................................ 702/182–185, 188
See application file for complete search history.

(56) References Cited

U.S. PATENT DOCUMENTS

| | | | |
|---|---|---|---|
| 6,434,512 B1 | 8/2002 | Discenzo | |
| 2010/0128284 A1 | 5/2010 | Riza et al. | |
| 2010/0321191 A1 | 12/2010 | Gong et al. | |
| 2011/0248846 A1* | 10/2011 | Belov et al. | 340/539.1 |

FOREIGN PATENT DOCUMENTS

CN    201185036    1/2009

OTHER PUBLICATIONS

CN201185036 Abstract Jan. 21, 2009.
I. Stiharu et al., "Sensor Requirements and Roadmaps," Nato Otan, R&T Organization, RTO-TR-AVT-128, Apr. 2009, ISBN: 978-92-837-0080-4, Chapter 6, pp. 6-1-6-46.
A R. Behbahani, "Need for Robust Sensors for Inherently Fail-Safe Gas Turbine Engine Controls, Monitoring, and Prognostics (Postprint)," AFRL-PR-WP-TP-2007-217, Nov. 2006, pp. 1-35.
M. Suster et al., "Micro-Power Wireless Transmitter for High-Temperature Mems Sensing and Communication Applications," IEEE 15th International Conference on Micro Electro Mechanical Systems, Aug. 7, 2002, pp. 641-644.

\* cited by examiner

*Primary Examiner* — Edward Raymond
(74) *Attorney, Agent, or Firm* — Joseph J. Christian

(57) ABSTRACT

A high accuracy wireless sensing platform assembly comprising a sensor subassembly that is configured to obtain measurement data from a device in response to a measurand; a data transceiver assembly that is configured to communicate with an antenna assembly; a parameter coder, in communication with the sensor subassembly, that is configured to control the data transceiver assembly and/or the sensor subassembly, based on the measurement data; and a resonant circuit that is formed by the data transceiver, the sensor subassembly, and/or the parameter coder. Embodiments are capable of provide robust performance and high accuracy in harsh (e.g., hot environments). The present invention has been described in terms of specific embodiment(s), and it is recognized that equivalents, alternatives, and modifications, aside from those expressly stated, are possible and within the scope of the appending claims.

35 Claims, 7 Drawing Sheets

HIGH ACCURACY WIRELESS SENSING PLATFORM

BACKGROUND OF THE INVENTION

The present invention relates generally to sensing and measuring technologies and more particularly to a wireless sensing platform that provides high accuracy of sensing and may be effectively used in harsh environments.

Existing sensing and measuring platforms, whether employing wired or wireless technologies, have shortcomings including accuracy, serviceability, and durability. For example, Radio Frequency Identification Devices (RFID) is one wireless technology that while partially addresses some of these shortcomings suffers from inaccuracy and measurement drift.

The shortcomings of these various existing sensing platforms is further exacerbated when the required sensing environment is harsh (e.g., hot environment, high Ph, aqueous, high vibrations and/or high rotational speeds, etc.)

Accordingly, there is an ongoing need for improving upon performance, durability, and/or cost with sensing and measurement systems.

BRIEF DESCRIPTION

The present invention overcomes at least some of the aforementioned drawbacks by providing a high accuracy wireless sensing platform. More specifically, the present invention is directed to a wireless sensing assembly that can provide more accurate measurement and sensing and, if needed, operability in harsh environments.

Therefore, in accordance with one aspect of the invention, a high accuracy wireless sensing platform assembly comprises: a sensor subassembly configured to obtain measurement data of a device in response to a measurand; a data transceiver assembly configurable to communicate with an antenna assembly; a parameter coder, in communication with the sensor subassembly, configured to control at least one of said data transceiver assembly and said sensor subassembly, based on the obtained measurement data; and a resonant circuit formed by at least one of the data transceiver, the sensor subassembly, and the parameter coder.

In accordance with another aspect of the invention, a high accuracy wireless sensing platform assembly comprises: a sensor subassembly configured to obtain measurement data of a device in response to a measurand; a parameter coder comprising a compensator subassembly, a controller, and a reference subassembly, wherein the compensator subassembly is in direct communication with the sensor subassembly and the reference subassembly, further wherein the parameter coder is configured to control at least one of a data transceiver assembly and said sensor subassembly, based on the obtained measurement data; a data transceiver assembly configurable to communicate with an antenna assembly, wherein the data transceiver assembly comprises a data transceiving antenna and an energy transceiver antenna, further wherein the energy transceiver antenna in communication with the parameter coder and is configured to power and affect an internal state of the parameter coder; and a resonant circuit formed by at least one of the data transceiver, the sensor subassembly, and the parameter coder; wherein a portion of the assembly comprises at least one of Sic MOSFTE, JEFT, and SiC diode.

Various other features and advantages of the present invention will be made apparent from the following detailed description and the drawings.

BRIEF DESCRIPTION OF THE DRAWINGS

The drawings illustrate one embodiment presently contemplated for carrying out the invention.

DETAILED DESCRIPTION

Aspects of the present invention have been shown to offer advantages over previous sensing technologies. Aspects of the present invention provide a wireless sensing solution that is accurate and avoids measurement drifts. Other aspects of the present invention provide for an auto compensating, self-powered wireless sensing platform that can reside and operate effectively amongst, for example, a hot rotating component (s) such as a part or portion of a turbine assembly and obtain measurement data of the assembly in response to a measurand. Ultimately, a high accuracy wireless sensing platform that can effectively be used in a harsh environment is provided.

For purposes of this disclosure the term "hot" and/or "hot environment" means any area or location, general or specific, that at least on occasion experiences a temperature that is substantially warmer than 80 degrees Fahrenheit. For example, a hot or hot environment may be at least about 95 degrees Fahrenheit. In some embodiments, a hot or hot environment may include temperatures that are at least about 150 degrees Fahrenheit. In some embodiments, a hot or hot environment may include temperatures that are at least about 250 degrees Fahrenheit. In some embodiments, a hot or hot environment may include temperatures that are at least about 350 degrees Fahrenheit. In some embodiments, a hot or hot environment may include temperatures that are at least about 400 degrees Fahrenheit. In some embodiments, a hot or hot environment may include temperatures that are at least about 375 degrees Celsius.

The term "device" as used herein is meant to be non-limiting and may apply to any single element or a plurality of elements, wherein the device may be a part of a subsystem or part of a larger system. Similarly, the device may be a portion or portion(s) of an assembly. The device that the assembly 10 is obtaining measurement data may be virtually any device. The device may, for example, be a portion of a moving (e.g., translating, rotating, etc.) assembly. For example, the device may be a portion of a rotating assembly, such as, but not limited to, a turbine assembly (e.g., stationary turbine, aircraft turbine, etc.).

Figure 1:
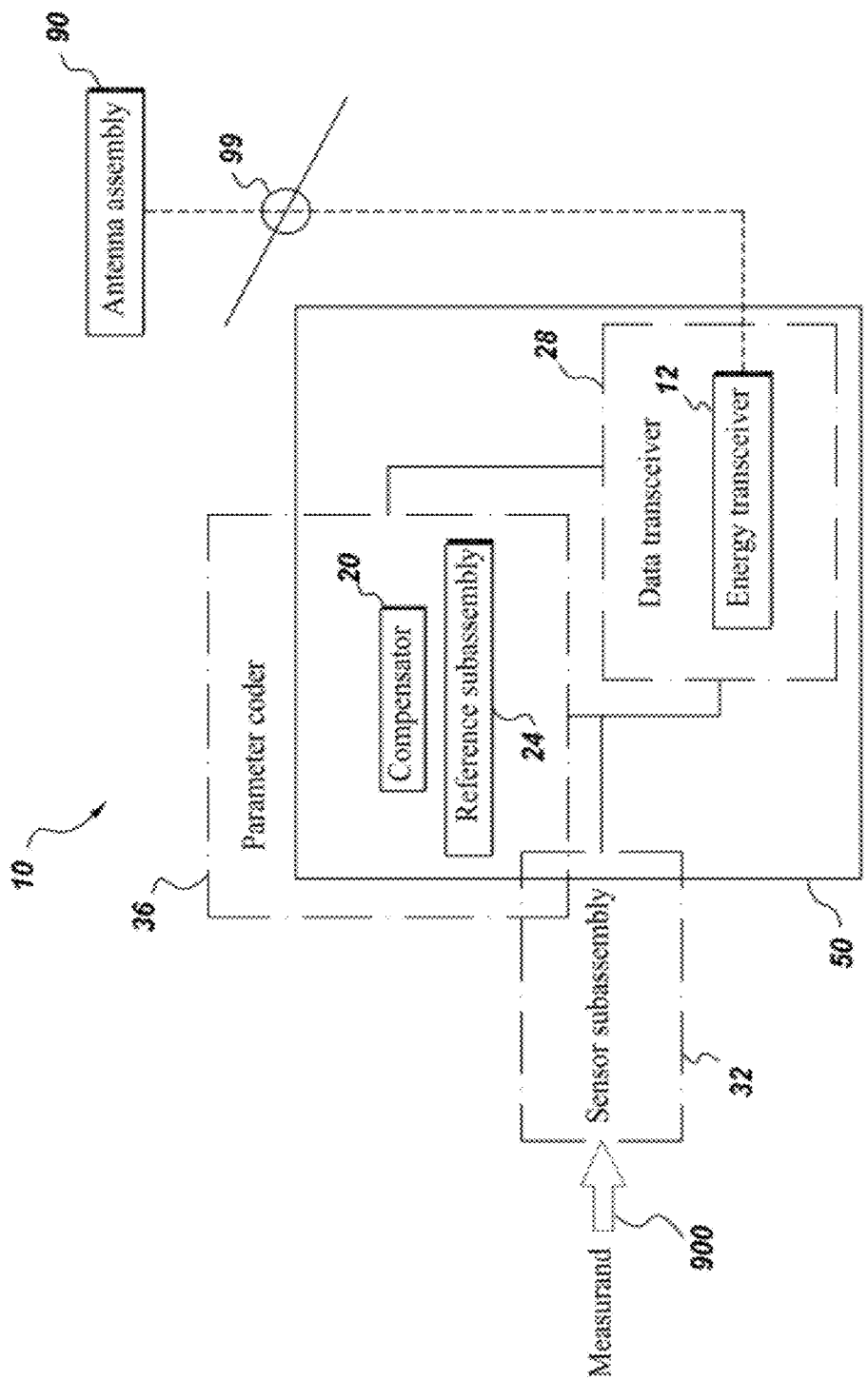
FIG. 1 is a functional diagram of an embodiment of a high accuracy wireless sensing platform, according to aspects of the present invention.

Referring to FIG. 1 a functional diagram of a wireless sensing platform, or assembly, is shown and denoted as 10. The assembly 10 may include various parts and elements configured so as to provide a means for measuring data from a device. The assembly 10 may further be in a communication with an antenna assembly 90 via communication means 99 (e.g., wireless means, radio frequency waves, etc.). The antenna assembly 90 that is in communication with the assembly 10 may be distal to the assembly 10 (e.g., greater than 1 foot away).

In one embodiment, as shown, the assembly 10 may comprise various components including a sensor subassembly 32, a data transceiver assembly 28, and a parameter coder 36. The sensor subassembly 32 is configured to obtain measurement data of a device (not shown) in response to a measurand 900. The data transceiver assembly 28 is configurable to communicate with the antenna assembly 90. The parameter coder 36 is in communication with the sensor subassembly 32. The parameter coder 36 is further configured to control one, or both, of the data transceiver assembly 28 and the sensor subassembly 32. A resonant circuit 50 may be formed by the data transceiver assembly 28, the parameter coder 36, and the sensor subassembly 32, based on the obtained measurement data. The data transceiver assembly 28 may further comprise an energy transceiver 12.

The antenna assembly 90 that is in communication with the assembly 10 may be in wireless communication with the data transceiver assembly 28. The antenna assembly 90 may be configured to at least one of selectively receive the measurement data from the assembly 10 and/or to transmit energy to the assembly 10. The antenna assembly 90 may act as a remote reader to the assembly 10. Various known or later developed technologies may be used to provide a suitable antenna assembly 90.

The parameter coder 36 may, depending on the particular embodiment, comprise additional elements. In an embodiment, as shown in FIG. 1, the parameter coder 36 may further comprise a compensator subassembly, or compensator 20. In another embodiment, the parameter coder 36 may further comprise the compensator subassembly 20 and a reference subassembly 24. In still another embodiment, the parameter coder 36 may further comprise the compensator subassembly 20, the reference subassembly 24, and a controller subassembly 16 (See e.g., FIG. 2). In another embodiment, the parameter coder 36 may comprise a reference subassembly 24 and wherein the compensator 20 is in direct communication with the sensor subassembly 32 and the reference subassembly 24.

The controller subassembly 16 may be configured to affect a state of the compensator 20. In another embodiment, the controller subassembly 16 may be configured to selectively activate both the reference subassembly 24 and the sensing subassembly 32.

The resonant circuit 50 may comprise passive elements including a capacitor, an inductor, and possibly a resistor. When connected together, these elements may act as an electrical resonator, an electrical analogue of a tuning fork, storing electrical energy oscillating at the circuit's resonant frequency.

Figure 2:
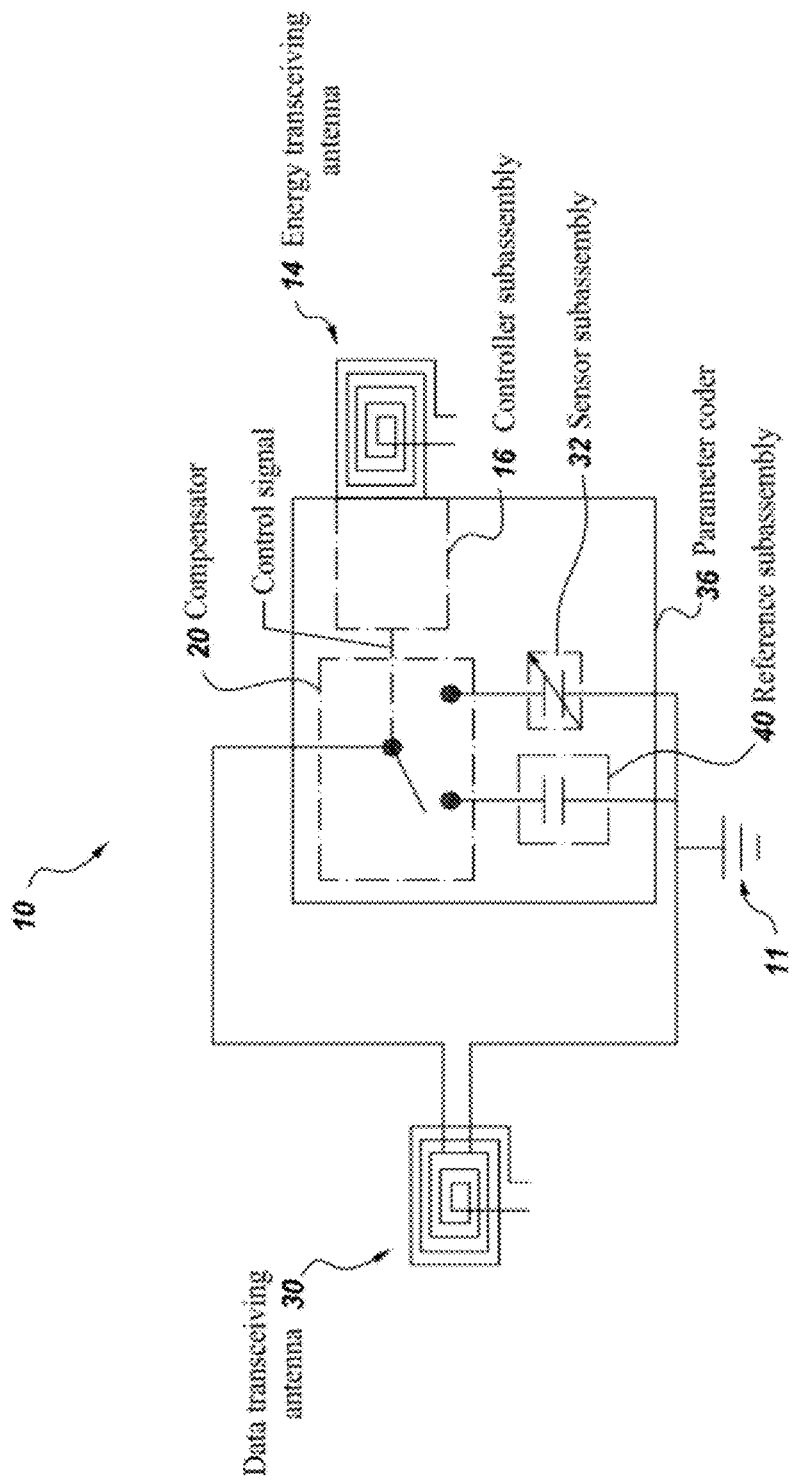
FIG. 2 is a schematic diagram of an embodiment of a high accuracy wireless sensing platform, according to aspects of the present invention.

Referring to FIG. 2, a schematic diagram of an embodiment of the assembly 10 is shown. The antenna assembly 90 (FIG. 1) with which the assembly 10 may communicate is not shown for clarity purposes. In any event, in the embodiment shown in FIG. 2, the assembly 10 comprises a circuit that includes a compensator 20, a controller subassembly 16, a sensor subassembly 32, and a reference subassembly 40, connected to a ground 11. The parameter coder 36 may comprise the compensator 20, the controller subassembly 16, the sensor subassembly 32, and the reference subassembly 40.

The data transceiver assembly 28 may comprise an energy transceiving antenna 14 and a data transceiving antenna 30 that are configured to communicate with an antenna assembly 90 (FIG. 1). Although FIG. 2 shows the energy transceiving antenna 14 and the data transceiving antenna 30 as two distinct antennas, in an embodiment, the functionality of transceiving energy and transceiving data may be provided from a single antenna operating at two distinct frequencies. Alternatively, the functionality of transceiving energy and transceiving data may be provided from two distinct antennas (e.g., energy transceiving antenna 14 and the data transceiving antenna 30) operating at different frequencies.

In another embodiment, the data transceiver assembly 28 comprises an energy transceiver 12, wherein the energy transceiver 12 is in communication with the parameter coder 36 and is configured to power and affect an internal state of the parameter coder 36. In another embodiment, the data transceiver assembly 28 comprises an energy transceiver 12, wherein the energy transceiver 12 is in communication with the parameter coder 36 and is configured to power and affect an internal state of the compensator 20.

As shown the compensator 20 may comprise a toggle-like switch that, depending on what type of control signal is received from the controller subassembly 16, may toggle to either connect to a first contact and make a circuit with the reference subassembly 40 or connect to a second contact and make a circuit with the sensor subassembly 32. Clearly, other configurations of compensator 20 than a toggle-like switch as depicted are possible.

The sensor subassembly 32 may be any suitable sensor, or plurality of sensors, that is configured to obtain measurement data of a device in response to a measurand. The measurand may comprise, for example, temperature, pressure, position, voltage, strain, acceleration, vibration, device health state, and combinations thereof.

The reference subassembly 40 may comprise a sensor that is configured to measure at least one measurand (e.g., temperature, pressure, position, voltage, strain, acceleration, vibration, device health state, and combinations thereof) but is shielded from a particular, corresponding measurand (e.g., temperature, pressure, position, voltage, strain, acceleration, vibration, and device health state). In this manner, the combination of a particular sensor subassembly 32 and a particular, complementary reference subassembly 40 allows for an auto-compensating effect of gathering more accurate measurement of data by the assembly 10.

For example, in an embodiment that is configured to accurately measure pressure, a pressure sensor may be used for the sensor subassembly 32, such that pressure and background data, or "noise", from all the other measurands is gathered by the sensor subassembly 32. To complement the pressure sensor, a sensor that is shielded from only pressure is used as the reference subassembly 40. The reference subassembly 40 would similarly gather background data, or "noise", from all the other measurands with the exception of pressure (due to shielding). In this manner, an effective measuring assembly that is more accurate at obtaining measurement data is provided.

Figure 3:
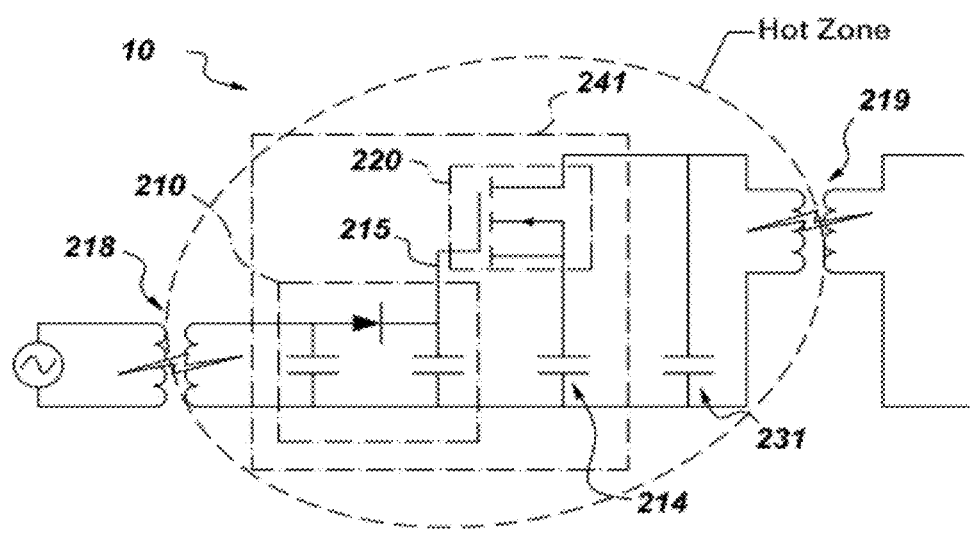
FIG. 3 is a schematic diagram of an embodiment of a high accuracy wireless sensing platform, according to aspects of the present invention.

Referring to FIG. 3, a schematic diagram of another embodiment of an assembly 10 is shown. As shown, the assembly 10 may be communicating with or more antenna assemblies. FIG. 3 depicts the assembly 10 communicating via an energy transceiving antenna 218 with an antenna assembly and via a data transceiving antenna 219 with another antenna assembly. As with other embodiments, the assembly may be communicating with one, or more than one, antenna assembly.

In any event, the assembly 10 may comprise a controller subassembly 210, a compensator subassembly 220, a reference subassembly 214, and a sensor subassembly 231. A parameter coder 241 comprises the controller subassembly 210, the compensator subassembly 220, and the reference subassembly 214. A control signal 215 is sent from the compensator subassembly 220 to the controller subassembly. As shown, a portion or the entire assembly 10 may be located in a hot zone (e.g., hot or harsh environment).

The controller subassembly 210 may comprise a diode and a capacitor. The reference subassembly 214 and the sensor subassembly 231 may comprise capacitors.

Figure 4:
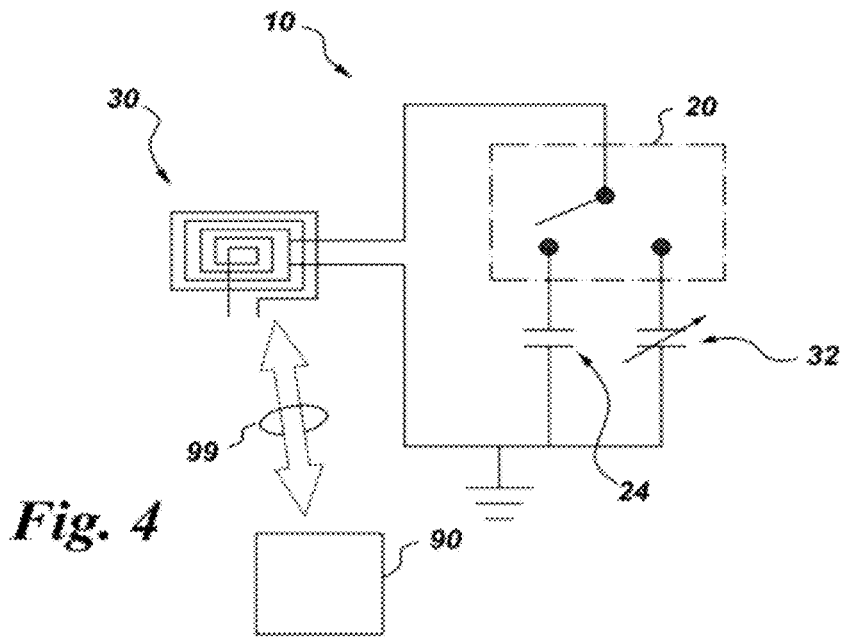
FIG. 4 is a schematic diagram of an embodiment of a high accuracy wireless sensing platform, according to aspects of the present invention.

Referring to FIG. 4, a schematic diagram of another embodiment of an assembly 10 is shown. The assembly 10 shown in FIG. 4 is similar to the embodiment shown in FIG. 2 further showing a wireless communication from the data transceiving antenna 30 via signals 99 with a remote reader 90.

Figure 5:
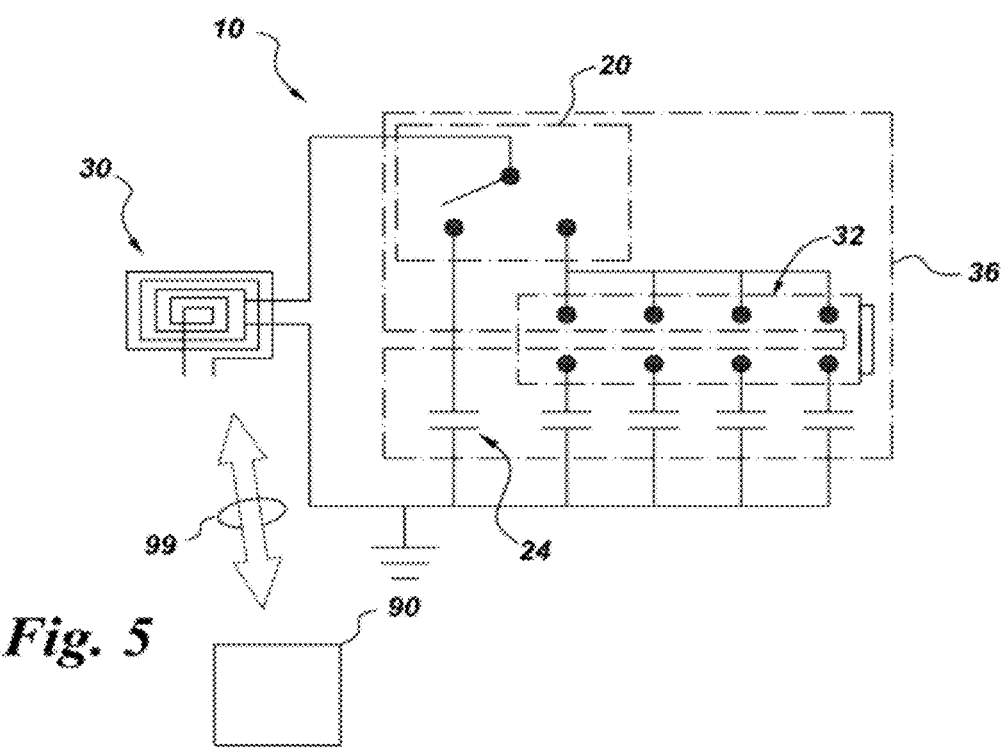
FIG. 5 is a schematic diagram of an embodiment of a high accuracy wireless sensing platform, according to aspects of the present invention.
Figure 7:
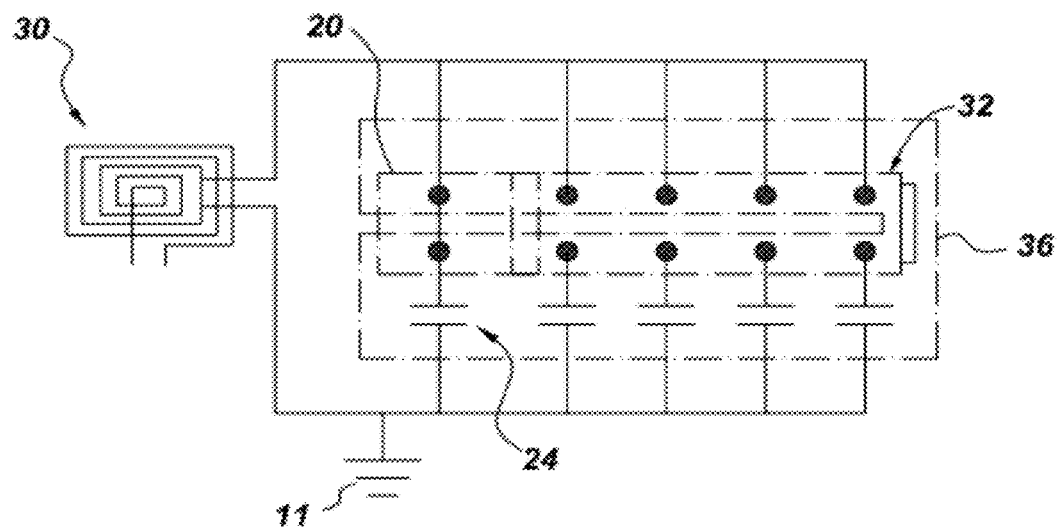
FIG. 7 is a schematic diagram of an embodiment of a high accuracy wireless sensing platform, according to aspects of the present invention.
Figure 8:
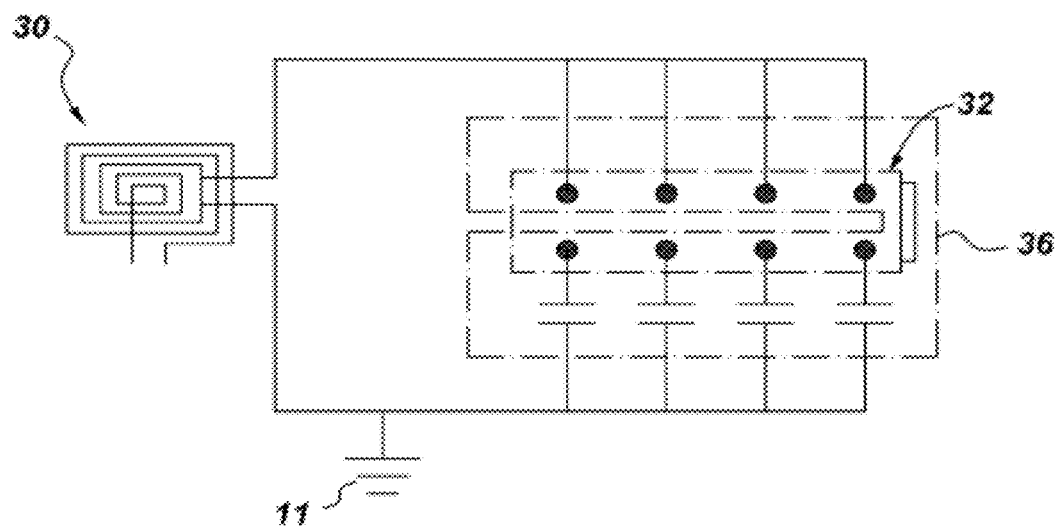
FIG. 8 is a schematic diagram of an embodiment of a high accuracy wireless sensing platform, according to aspects of the present invention.

Referring collectively to FIGS. 5, 7, and 8, schematic diagrams of various similar embodiments of an assembly 10 are shown. The assembly 10 includes a circuit in communication with an antenna 30 and a ground 11. The antenna 30 of the assembly 10 is further in wireless communication 99 with a remote reader 90. The circuit comprises a sensor subassembly 32 in communication with a reference subassembly 24. In the embodiments shown in FIGS. 5 and 7, the circuit further comprises a compensator 20. The parameter coder 36 may comprise the compensator 20 (if any), the sensor subassembly 32, and the reference subassembly 24.

As shown, the sensor assembly 32 may comprise a shorting bar and a plurality of switching terminals. The sensor assembly 32 may be configured to respond to a measurand and move laterally amongst the plurality of switching terminals. In this manner, the sensor assembly operates so that the assembly 10 effectively acts to produce a discretized output from the obtained measurement data from the measurand.

Figure 6A:
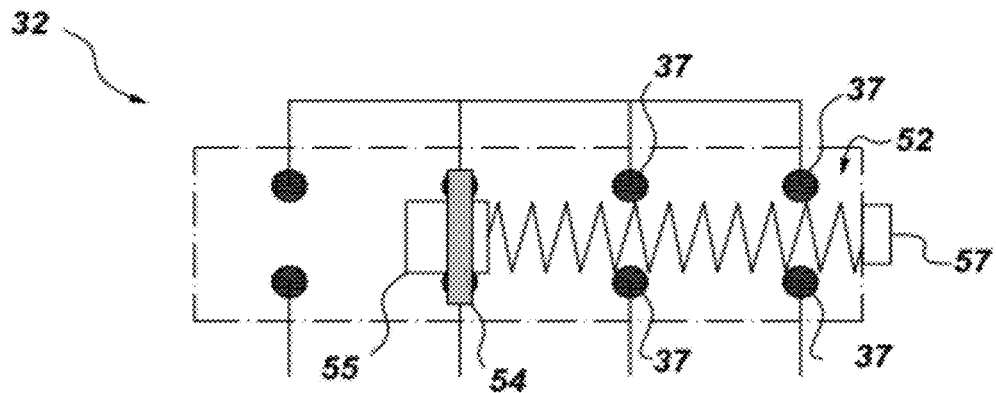
FIG. 6A is a detailed schematic diagram of an embodiment of a sensor portion of a high accuracy wireless sensing platform of FIGS. 5, 7 and/or 8.
Figure 6B:
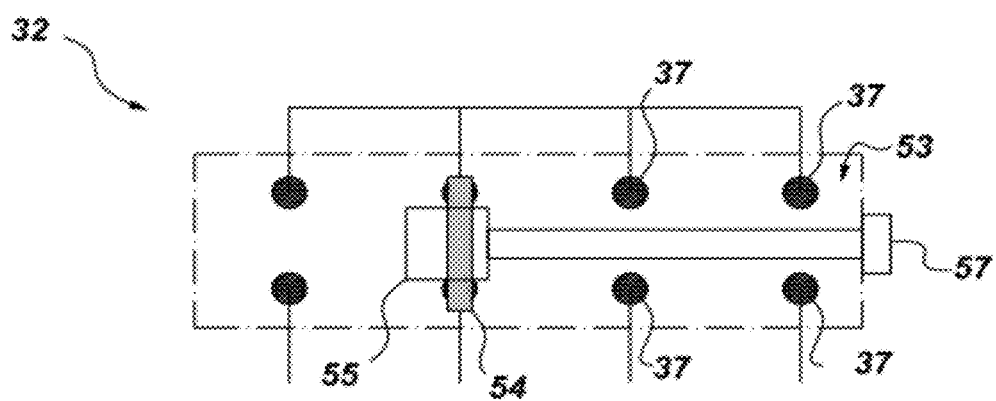
FIG. 6B is a detailed schematic diagram of another embodiment of a sensor portion of a high accuracy wireless sensing platform of FIGS. 5, 7 and/or 8.

Referring to FIGS. 6A and 6B, schematic diagrams of two embodiments of sensor subassemblies that may be used in, for example, the embodiments shown in FIGS. 5, 7, and 8 are shown. The sensor subassembly 32 shown in FIG. 6A is an accelerometer embodiment configured to obtain measurement data from a measurand, wherein the measurand is acceleration. The sensor subassembly 32 comprises a Micro-Electro-Mechanical (MEMs) device including an anchor 57, a spring 52, a proof mass 55, and a shorting bar 54. As shown, the proof mass 55 and anchor 57 are positioned at either end of the spring 52. The proof mass 55 and shorting bar 54 connected thereto move or vibrate laterally thereby connecting the shorting bar 54 to one of the plurality of switching terminals 37, thereby connecting a circuit to one of the plurality of capacitors (See e.g., FIGS. 5, 7 and/or 8).

The sensor subassembly 32 shown in FIG. 6B is a temperature sensor embodiment configured to obtain measurement data from a measurand, wherein the measurand is temperature. The sensor subassembly 32 comprises a MEMs device including an anchor 57, a temperature responsive element 53, a proof mass 55, and a shorting bar 54. The temperature responsive element may comprise an element that changes, for example, shape, or length, with temperature. The temperature responsive element 53 may comprise a bi-metal strip. As shown, the proof mass 55 and anchor 57 are positioned at either end of the temperature responsive element 53. The proof mass 55 and shorting bar 54 connected thereto move laterally thereby connecting the shorting bar 54 to one of the plurality of switching terminals 37, thereby connecting the circuit to one of the plurality of capacitors (See e.g., FIGS. 5, 7 and/or 8).

In an embodiment, the sensor subassembly 32 comprises a multi-state base sensor and the parameter coder 36 comprises a portion of the multi-state base sensor. Depending on the embodiment, parameter coder 36 may comprise a dielectric material of a capacitor, a high permeability material of an inductor, and/or a selectively lossy material. With any of the aforementioned embodiments (e.g., dielectric material of a capacitor, the high permeability material of an inductor, and/or the selectively lossy material), the material(s) may further comprise a material that has a phase change characteristic. In another embodiment, the selectively loss material may comprise, for example, a material that is a conductive material of a resistor.

Figure 9:
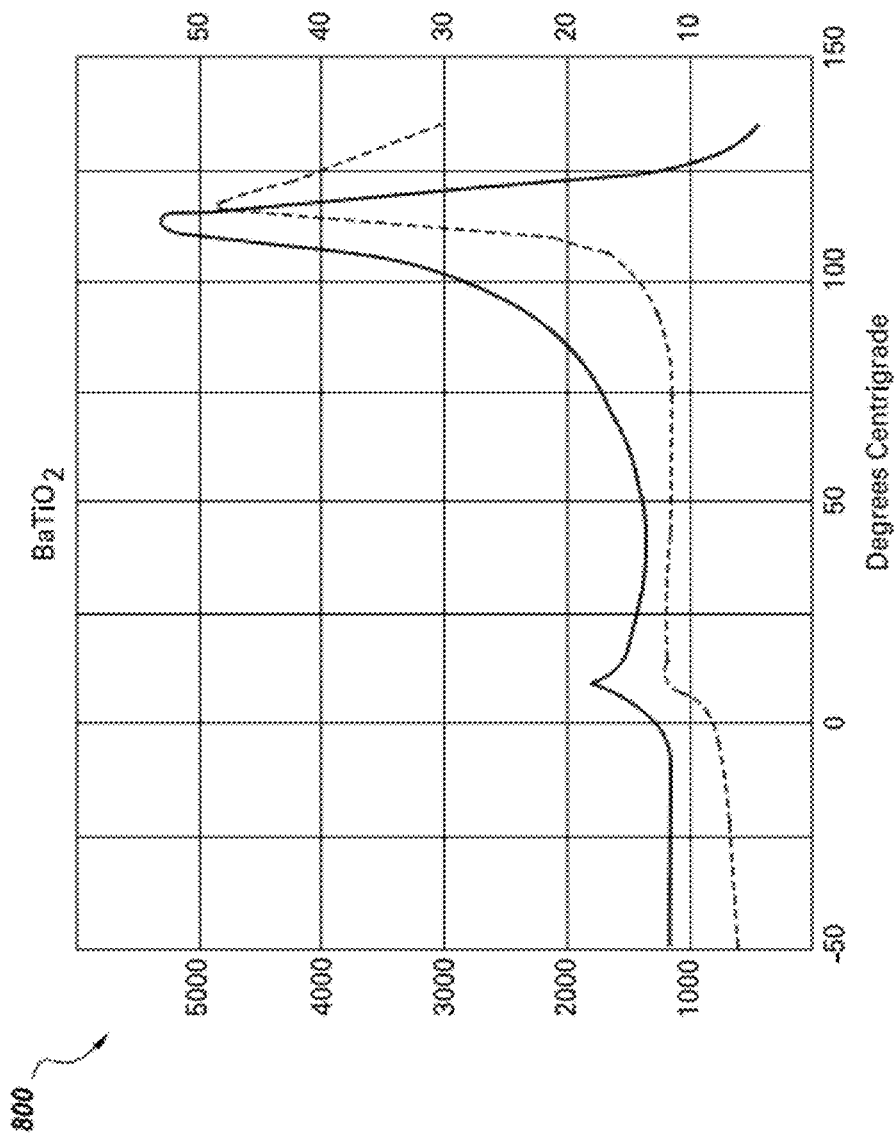
FIG. 9 is an exemplary graph showing dielectric constant and loss factor vs. temperature for the behavior of $BaTiO_2$.

Various materials that have a significant change in dielectric constant over the change in a measurand may be used. For example, there are materials that have a significant change in dielectric constant in relationship to changes in temperature. One such material is $BaTiO_2$. FIG. 9 depicts a graph showing a dielectric constant and loss factor vs. temperature, for $BaTiO_2$.

The assembly 10 may be constructed and installed in a variety of ways, under aspects of the present invention. The functionality of the assembly 10 and the various elements may be comprised of, for example, one of Micro-Electro-Mechanical (MEMs) devices, mechanical devices, electromechanical devices, resistor(s), capacitor(s), inductor(s), memristor(s), and combinations thereof. Similarly, at least portions of the assembly 10 may comprise one of Silicon Carbide Metal-Oxide Semiconductor Field-Effect Transistor (SiC MOSFET), Junction Field Effect Transistor (JFET), and SiC diodes. The method of installing the assembly 10, for example, on a device, may comprise using one, or more than one, known or later developed deposition techniques. For example, the assembly 10 may be applied to the device using at least one of direct-write, plasma spray, sputtering, transfer, and appliqué deposition techniques.

Embodiments of the present invention can be used in a substantially hot environments. A portion of or the entirety of system 10 may be installed and operated in a hot environment. For example, referring to FIG. 1, the assembly 10 may be in a hot environment while the antenna assembly 90 may be in an ambient or cool environment. The antenna assembly 90 may advantageously be distal (e.g., several feet from) from the assembly 10.

Embodiments of the high accuracy wireless sensing platform can be used to measure data in various technologies. One example of the technical environment that the platform can be used in is wherein the device that the sensing element is measuring is a part of a turbine (e.g., stationary turbine, aircraft engine, etc.). Being wireless the sensing platform offers advantages in an environment that includes moving (e.g., rotating, translating, etc.) elements, there is no reason that the platform cannot effectively be employed to measure data in entirely stationary environments.

While the embodiments illustrated and described herein may be used in a hot environment with a moving device, aspects of the invention are not limited as such. For example, embodiments of the invention may be used in other environments, such as with stationary devices, devices in hard to get to locations, harsh environments with a stationary device, devices in effective RF cages, or harsh RF environments where it may be difficult to get data out wirelessly by conventional RF means.

Therefore, according to one embodiment of the present invention, a high accuracy wireless sensing platform assembly comprises: a sensor subassembly configured to obtain measurement data of a device in response to a measurand; a data transceiver assembly configurable to communicate with an antenna assembly; a parameter coder, in communication with the sensor subassembly, configured to control at least one of said data transceiver assembly and said sensor subassembly, based on the obtained measurement data; and a resonant circuit formed by at least one of the data transceiver, the sensor subassembly, and the parameter coder.

According to another embodiment of the present invention, a high accuracy wireless sensing platform assembly comprises: a sensor subassembly configured to obtain measurement data of a device in response to a measurand; a parameter coder comprising a compensator subassembly, a controller, and a reference subassembly, wherein the compensator subassembly is in direct communication with the sensor subassembly and the reference subassembly, further wherein the parameter coder is configured to control at least one of a data transceiver assembly and said sensor subassembly, based on the obtained measurement data; a data transceiver assembly configurable to communicate with an antenna assembly, wherein the data transceiver assembly comprises a data transceiving antenna and an energy transceiver antenna, further wherein the energy transceiver antenna in communication with the parameter coder and is configured to power and affect an internal state of the parameter coder; and a resonant circuit formed by at least one of the data transceiver, the sensor subassembly, and the parameter coder; wherein a portion of the assembly comprises at least one of Sic MOSFTE, JEFT, and SiC diode.

The present invention has been described in terms of the preferred embodiment, and it is recognized that equivalents, alternatives, and modifications, aside from those expressly stated, are possible and within the scope of the appending claims.

What is claimed is:

1. A high accuracy wireless sensing platform assembly comprising:
    a sensor subassembly configured to obtain measurement data of a device in response to a measurand, wherein the sensor subassembly comprises a shorting bar and a plurality of switching terminals;
    a data transceiver assembly configurable to communicate with an antenna assembly;
    a parameter coder, in communication with the sensor subassembly, configured to control at least one of said data transceiver assembly and said sensor subassembly, based on the obtained measurement data; and
    a resonant circuit formed by at least one of the data transceiver, the sensor subassembly, and the parameter coder.

2. The assembly of claim 1, further comprising an antenna assembly in wireless communication with the data transceiver assembly, wherein the antenna assembly is configured to at least one of selectively receive the measurement data from the sensing platform assembly and to transmit energy to the sensing platform assembly.

3. The assembly of claim 1, wherein parameter coder comprises a compensator subassembly.

4. The assembly of claim 3, wherein parameter coder further comprises a reference subassembly.

5. The assembly of claim 4, wherein the compensator subassembly is in direct communication with the sensor subassembly and the reference subassembly.

6. The assembly of claim 4, wherein the parameter coder comprises a controller.

7. The assembly of claim 6, wherein the controller affects a state of the compensator.

8. The assembly of claim 6, wherein the controller selectively activates the reference subassembly and the sensing subassembly.

9. The assembly of claim 1, wherein the data transceiver assembly comprises an energy transceiver in communication with the parameter coder and is configured to power and affect an internal state of the parameter coder.

10. The assembly of claim 1, wherein at least a portion of the assembly is located in a substantially hot environment.

11. The assembly of claim 1, wherein the data transceiver assembly comprises an energy transceiver in communication with the parameter coder and is configured to power and affect an internal state of the compensator.

12. The assembly of claim 1, wherein the parameter coder comprises a controller.

13. The assembly of claim 1, wherein the device is a rotating element.

14. The assembly of claim 13, wherein the rotating element is a part of a turbine assembly.

15. The assembly of claim 1, wherein the measurand comprises one of temperature, pressure, position, voltage, strain, acceleration, vibration, device health state, and combinations thereof.

16. The assembly of claim 1, wherein at least a portion of the assembly is applied to the device with a deposition technique comprising one of direct-write, plasma spray, sputtering, transfer and applique.

17. The assembly of claim 1, wherein the assembly is comprised of one of MEMs devices, mechanical devices, electro-mechanical devices, resistor, capacitor, inductor, memristor, and combinations thereof.

18. The assembly of claim 1, wherein the data transceiver comprises an energy transceiving antenna and a data transceiving antenna.

19. The assembly of claim 18, wherein the energy transceiving antenna and the data transceiving antenna are a single antenna.

20. The assembly of claim 18, wherein the energy transceiving antenna and the data transceiving antenna operate at two different frequencies.

21. The assembly of claim 18, wherein at least one of the energy transceiving antenna and the data transceiving antenna is used for inductive coupling.

22. The assembly of claim 1, wherein a portion of the assembly comprises one of SiC MOSFET, JFET, and SiC Diode.

23. The assembly of claim 1, wherein the sensor subassembly comprises a multi-state base sensor and the parameter coder comprises a portion of the multi-state base sensor.

24. The assembly of claim 23, wherein the parameter coder comprises a dielectric material of a capacitor.

25. The assembly of claim 24, wherein the dielectric material comprises a material with a phase change characteristic.

26. The assembly of claim 23, wherein the parameter coder comprises a high permeability material of an inductor.

27. The assembly of claim 26, wherein the high permeability material comprises a material with a phase change characteristic.

28. The assembly of claim 23, wherein the parameter coder comprises a selectively lossy material.

29. The assembly of claim 28, wherein the selectively lossy material comprises a material with a phase change characteristic.

30. The assembly of claim 28, wherein the selectively lossy material comprises a material that is a conductive material of a resistor.

31. A high accuracy wireless sensing platform assembly comprising:
- a sensor subassembly configured to obtain measurement data of a device in response to a measurand;
- a parameter coder comprising a compensator subassembly, a controller, and a reference subassembly, wherein the compensator subassembly is in direct communication with the sensor subassembly and the reference subassembly, further wherein the parameter coder is configured to control at least one of a data transceiver assembly and said sensor subassembly, based on the obtained measurement data;
- a data transceiver assembly configurable to communicate with an antenna assembly, wherein the data transceiver assembly comprises a data transceiving antenna and an energy transceiver antenna, further wherein the energy transceiver antenna in communication with the parameter coder and is configured to power and affect an internal state of the parameter coder; and
- a resonant circuit formed by at least one of the data transceiver, the sensor subassembly, and the parameter coder;
- wherein a portion of the assembly comprises at least one of Sic MOSFTE, JEFT, and SiC diode.

32. The assembly of claim 31, wherein the measurand comprises one of temperature, strain, and combinations thereof.

33. A high accuracy wireless sensing platform assembly comprising:
- a sensor subassembly configured to obtain measurement data of a device in response to a measurand;
- a data transceiver assembly configurable to communicate with an antenna assembly;
- a parameter coder, in communication with the sensor subassembly, configured to control at least one of said data transceiver assembly and said sensor subassembly, based on the obtained measurement data; and
- a resonant circuit formed by at least one of the data transceiver, the sensor subassembly, and the parameter coder, wherein at least a portion of the assembly is applied to the device with a deposition technique comprising one of direct-write, plasma spray, sputtering, transfer and applique.

34. A high accuracy wireless sensing platform assembly comprising:
- a sensor subassembly configured to obtain measurement data of a device in response to a measurand;
- a data transceiver assembly configurable to communicate with an antenna assembly;
- a parameter coder, in communication with the sensor subassembly, configured to control at least one of said data transceiver assembly and said sensor subassembly, based on the obtained measurement data; and
- a resonant circuit formed by at least one of the data transceiver, the sensor subassembly, and the parameter coder, wherein a portion of the assembly comprises one of SiC MOSFET, JFET, and SiC Diode.

35. A high accuracy wireless sensing platform assembly comprising:
- a sensor subassembly configured to obtain measurement data of a device in response to a measurand;
- a data transceiver assembly configurable to communicate with an antenna assembly;
- a parameter coder, in communication with the sensor subassembly, configured to control at least one of said data transceiver assembly and said sensor subassembly, based on the obtained measurement data; and
- a resonant circuit formed by at least one of the data transceiver, the sensor subassembly, and the parameter coder, wherein the sensor subassembly comprises a multi-state base sensor and the parameter coder comprises a portion of the multi-state base sensor.

* * * * *

UNITED STATES PATENT AND TRADEMARK OFFICE
CERTIFICATE OF CORRECTION

PATENT NO. : 8,718,979 B2
APPLICATION NO. : 13/077598
DATED : May 6, 2014
INVENTOR(S) : Berkcan et al.

It is certified that error appears in the above-identified patent and that said Letters Patent is hereby corrected as shown below:

In the Specification

In Column 1, Line 64, delete "Sic MOSFTE, JEFT," and insert -- SiC MOSFET, JFET, --, therefor.

In Column 7, Lines 40-41, delete "Sic MOSFTE, JEFT," and insert -- SiC MOSFET, JFET, --, therefor.

In the Claims

In Column 9, Line 34, in Claim 31, delete "Sic MOSFTE, JEFT," and insert -- SiC MOSFET, JFET, --, therefor.

Signed and Sealed this
Ninth Day of December, 2014

Michelle K. Lee
*Deputy Director of the United States Patent and Trademark Office*